United States Patent Office 3,238,204
Patented Mar. 1, 1966

3,238,204
METHOD FOR PREPARING HALOGENATED AMIDES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Apr. 12, 1963, Ser. No. 272,533
13 Claims. (Cl. 260—247.7)

This application, now abandoned, is a continuation-in-part of co-pending application Serial No. 735,702, filed May 16, 1958, for Halogenated Organic Compounds, of Murray Hauptschein and Milton Braid.

This invention relates to a new method for preparing halogenated amides.

In accordance with the preesnt invention, a new one-step method has been found for preparing halogenated amides by the reaction of halogenated, and especially highly fluorinated, halosulfates with ammonia or with primary or secondary amines. In many instances, particularly in the case of highly halogenated amides, the method of the invention provides a simpler and more economical method of preparation. While according to conventional procedures, it is necessary to prepare and isolate the carboxylic acid, and then convert the acid to an acyl halide which is finally reacted with ammonia or an amine to produce the desired amide, in accordance with the invention the amide is prepared directly through a unique one-step reaction from a corresponding halogenated halosulfate.

The method of the invention may be illustrated by the reaction of a perfluoroalkylchlorosulfate, e.g.

$$CF_3CF_2CF_2OSO_2Cl$$

with ammonia to produce the perfluorinated amide

in accordance with the following:

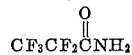

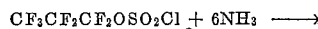

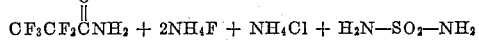

As may be seen, the reaction proceeds (from a formal standpoint) through the elimination of the halosulfate group and the conversion of the adjacent $CF_2$ group to the amide group

While the invention is neither limited to, nor depends upon, any particular reaction mechanism, it is believed that it proceeds according to the following:

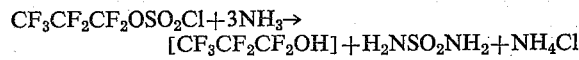

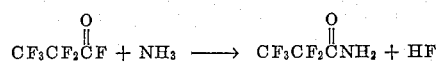

In accordance with the above, the ammonia first reacts with the halosulfate to form the unstable α,α-dihalo alcohol. This unstable intermediate alcohol then loses HF to produce the acyl halide. The acyl halide in the presence of an excess of ammonia reacts further to produce the amide and another mole of HF. It is believed that the reaction with primary and secondary amines takes a similar course, with the amine furnishing the labile hydrogen to produce the postulated intermediate α,α-dihalo alcohol, the amine then reacting with the postulated intermediate acyl halide to produce the amide.

Regardless of the validity of the above postulated reaction mechanism, it has been found that the reaction of the invention is unique to halosulfates in which the α-carbon atom (i.e. the carbon to which the halosulfate group is attached) is dihalogenated. For example, where the α-carbon atom is dihydrogenated (i.e. halosulfates of the type $RCH_2OSO_2X$ where X is chlorine or fluorine) the amides are not formed. The halosulfate in this case undergoes hydrolysis to the corresponding alcohol, $RCH_2OH$. Similarly, where the α carbon is only monohalogenated as in halosulfates of the type $RCHXOSO_2X$ where X is chlorine or fluorine, the amide does not form; such halosulfates undergo hydrolysis to an aldehyde or aldehydrol.

The halosulfates used as starting materials in the present invention include chlorosulfates and fluorosulfates of the general formula $RCX_2OSO_2X$ where X is fluorine or chlorine and where R is a halocarbon radical in which the halogens are preferably fluorine and/or chlorine.

Preferred are halosulfates in which R is at least half halogenated (i.e. the ratio of halogen to carbon atoms is at least 1:1) and particularly those in which R is at least half fluorinated. If desired, R may contain various functional groups unreactive with ammonia or amines such as nitro, alkoxy, hydroxy, nitrile or the like. The number of carbon atoms contained in the radical R is not critical as will be illustrated in the examples which follow, but in most practical applications, R will contain from 1 to 100 and more usually from 1 to 50 carbon atoms.

In the halosulfate starting materials, the sulfur of the halosulfate groups is linked to the carbon atom in the —$CX_2$— group through an oxygen atom. These halosulfates thus have the structure

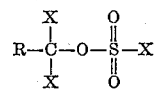

rather than the sulfonyl halide structure

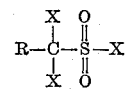

or the sulfonic acid structure

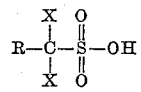

where the sulfur is connected directly to a carbon atom.

A class of halosulfates which are particularly valuable as starting materials are those in which the radical R in the formula given above is a perfluoroalkyl, a perfluorochloroalkyl, a perfluorohydroalkyl, or a perfluorochlorohydroalkyl radical. As used herein, the term perfluoro, as applied to radicals or compounds, means a radical or compound containing only fluorine and carbon. The term perfluorochloro denotes radicals or compounds containing only fluorine, chlorine and carbon in which the ratio of fluorine to chlorine atoms is at least 1:1. Perfluorohydro denotes compounds or radicals containing only fluorine, hydrogen and carbon in which the ratio of fluorine to hydrogen atoms is at least 1:1. The term perfluorochlorohydro denotes compounds or radicals containing only fluorine, chlorine, hydrogen and carbon in which the ratio of fluorine plus chlorine atoms to hydrogen atoms is at least 1:1. The valuable highly halogenated amides prepared from these preferred classes of halosulfates according to the invention are often difficult to prepare by other procedures.

The new method of the invention may be used for the preparation of polyamides (i.e. amides containing two or more amido groups) as well for the preparation of monoamides. In this case, a polyhalosulfate (i.e. a halosulfate containing 2 or more halosulfate groups) is used as the starting material and reacted with a monoamine or a polyamine. A dihalosulfate, for example reacted with ammonia or a primary or secondary amine will produce a diamide, whereas a dihalosulfate reacted with a polyamine, e.g. hexamethylene diamine, will produce a polyamide.

The polyhalosulfate starting materials useful in the present invention are included within the scope of the general formula $RCX_2OSO_2X$ where X and R are as defined above. In the case of the polyhalosulfates, the halocarbon radical R will contain one or more additional $-CX_2OSO_2X$ groups as in the dihalosulfate $$ClO_2SOCF_2-[CF_2]_3-CF_2OSO_2Cl$$

A preferred class of polyhalosulfates useful as starting materials in the present invention are the dihalosulfates, particularly those of the general formula $$XO_2SOCX_2-R'-CX_2OSO_2X$$

where X is fluorine or chlorine and where R' is an alkylene radical from the class consisting of perfluoro, perfluorochloro, perfluorohydro, or perfluorochlorohydro alkylene radicals. Preferably, the radical R' will contain from 1 to 20 and particularly from 1 to 10 carbon atoms.

The halosulfate starting materials may be prepared by the reaction of a corresponding iodide $RCX_2I$ with chlorosulfonic or fluosulfonic acid following the procedures described in detail in our co-pending application Serial No. 735,702, filed May 16, 1958, for Halogenated Organic Compounds, now abandoned. The reaction between the iodide and the acid is carried out at temperatures ranging from $-20$ to $300°$ C. depending upon the particular iodide. The reaction is preferably carried out in the presence of a large excess of the acid. Reaction pressure is not critical and, where the iodide is not a volatile compound, the reaction is most conveniently carried out at atmospheric pressure. Reaction time is likewise not critical and will be adjusted in accordance with the reactivity of the particular iodide. Excess chlorosulfonic or fluosulfonic acid may be removed by pouring the reaction mixture over crushed ice whereupon the halosulfate, being generally water insoluble, will separate as a lower organic layer. Where the halosulfate reaction product and the halosulfonic acid are immiscible, isolation of product is effected by simple phase separation.

A class of halosulfate starting materials of particular interest and value are those prepared from telomers of halogenated olefins, particularly telomers of tetrafluoroethylene, chlorotrifluoroethylene and vinylidene fluoride. The telomer iodides of such olefins may be prepared by known procedures and then converted to halosulfates to produce telomer halosulfates such as those of the formulae: $R[CF_2CF_2]_nOSO_2X$; $R[CF_2CFCl]_nOSO_2X$; and $R[CH_2CF_2]_nOSO_2X$ where R is a halocarbon radical as defined above and where $n$ is an integer ranging from 1 to about 40.

Typical halosulfates that may be reacted with ammonia or primary or secondary amines in accordance with the invention are the following:

$CF_3CF_2OSO_2Cl$
$CF_3CF_2CF_2OSO_2Cl$
$CF_3CF_2CF_2OSO_2F$
$CF_2ClCF_2OSO_2Cl$
$CFCl_2CF_2OSO_2Cl$
$CF_2ClCFClOSO_2Cl$
$CF_2ClCFClOSO_2F$
$CF_2BrCFClOSO_2Cl$
$CF_3CF_2CF_2CF_2OSO_2Cl$
$CF_2ClCCl_2OSO_2Cl$
$CHF_2CF_2OSO_2Cl$
$CHF_2CFClOSO_2Cl$
$CF_3CH_2CF_2OSO_2Cl$
$CF_2ClCH_2CF_2OSO_2Cl$
$C_3F_7CH_2CF_2OSO_2Cl$
$CF_2ClCFClCH_2CF_2OSO_2Cl$
$CFCl_2CF_2CH_2CF_2OSO_2Cl$

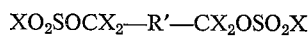
$CF_3CF_2CF[CH_2CF_2]_3OSO_2Cl$ $C_7F_{15}CH_2CF_2OSO_2Cl$

$C_2F_5CF[CH_2CF_2]_2OSO_2F$ $C_3F_7[CF_2CF]_4[CF_2CF_2]_9OSO_2Cl$
$C_7F_{15}OSO_2Cl$
$CF_3[CF_2]_7OSO_2Cl$ $CF_2ClCF[CF_2CF_2]_2OSO_2Cl$ (with CF$_3$ branch)

$CF_2ClCF[CF_2CF_2]_3OSO_2Cl$ (with CF$_3$ branch)

$CF_2ClCF[CF_2CF_2]_4OSO_2Cl$ (with CF$_3$ branch)

$CF_3CF[CF_2CF_2]_3OSO_2Cl$ (with CF$_3$ branch)

$CF_3CF[CF_2CF_2]_4OSO_2Cl$ (with CF$_3$ branch)

$CF_3CF[CF_2CF_2]_5OSO_2Cl$ (with CF$_3$ branch)
$CF_2=CFCF_2CF_2OSO_2Cl$
$CF_2=CFCF_2CFClOSO_2Cl$
$CF_3CFClOSO_2Cl$
$CF_3CF_2CFClOSO_2Cl$
$CF_3CF_2CCl_2OSO_2Cl$
$CF_2ClCF_2CCl_2OSO_2Cl$
$CHF_2CF_2CFClOSO_2Cl$
$CF_2ClCF_2CF_2OSO_2Cl$
$CFCl_2CF_2CF_2OSO_2Cl$
$CH_2ClCF_2CF_2OSO_2Cl$
$CH_3CF_2CF_2OSO_2Cl$
$O_2NCH_2CF_2CF_2OSO_2Cl$
$ONCH_2CF_2CF_2OSO_2Cl$
$ONCF_2CF_2CF_2OSO_2Cl$
$O_2NCF_2CF_2CF_2OSO_2Cl$
$CF_2CFClOSO_2Cl$
$ClSO_2O-CF_2[CF_2CF_2]_3CF_2OSO_2Cl$
$ClSO_2OCF_2CF_2CF_2CF_2CF_2OSO_2Cl$
$ClSO_2OCF_2CF_2CF_2OSO_2Cl$
$ClSO_2OCF_2(CH_2CF_2)_4OSO_2Cl$
$ClSO_2OCF_2(CH_2CF_2)_6OSO_2Cl$

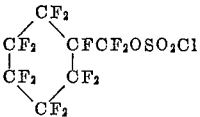

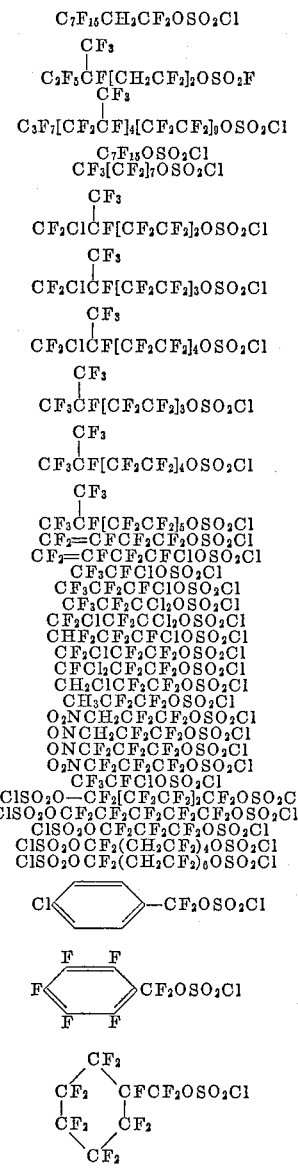

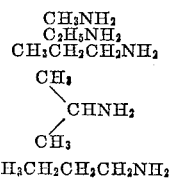

In general ammonia or organic amines having a free hydrogen on the amino group will react with the specified class of chlorosulfates to form amides. Thus, the invention is applicable generally to primary and secondary organic amines, including e.g. alkyl amines and cycloalkyl amines, unsaturated amines, such as allyl amine; aromatic amines such as aniline; heterocyclic amines such as piperidine, morpholine, piperazine and amines containing various groups such as halogen, hydroxyl, nitro, carboxy, amido, ether, thioether or ester groups. It is applicable to polyamines as well as to monoamines. The aliphatic amines are particularly suitable because of the readiness with which they react. The number of carbon atoms in the amine is not critical, although the invention will find more usual application with amines having from 1 to 30 carbon atoms and most often from 1 to about 12 carbon atoms.

The following amines are typical of those useful in the process of the invention:

$CH_3NH_2$
$C_2H_5NH_2$
$CH_3CH_2CH_2NH_2$

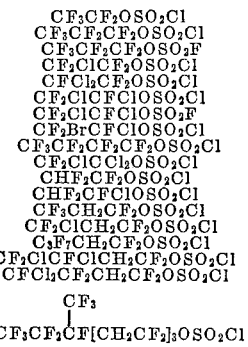

$CH_3CH_2CH_2CH_2NH_2$

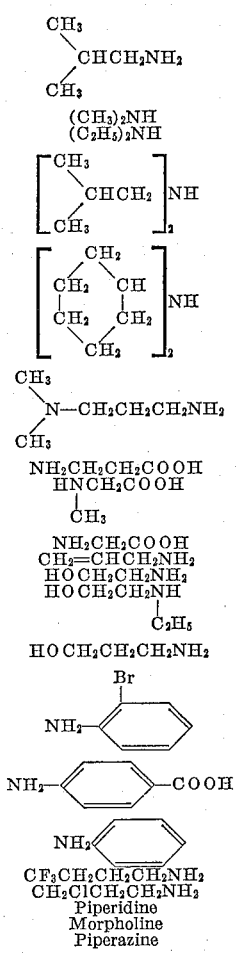
Piperidine
Morpholine
Piperazine

The reaction between the chlorosulfate and the amine may be carried out over a wide range of temperatures including temperatures as low as about −80° C. up to about +300° C. In general, temperatures of from −20° to +200° C. will be found preferable. In the case of ammonia, because of its high reactivity, low temperatures of, e.g. −80 to +50° C. and usually from −20° C. to +20° C. are generally preferred. Primary amines in many cases are also very reactive, and generally relatively low temperatures of −20° to +100° C. are preferred for this type of amine. Secondary amines are in some cases less reactive and may require somewhat higher temperatures.

Pressure is not a critical factor, and while the reaction is generally carried out most conveniently at atmospheric pressure, if desired sub-atmospheric or super-atmospheric pressures may be used.

The reaction time will vary considerably depending principally upon the reactivity of the amine. With ammonia and many primary amines, the reaction occurs very rapidly and is complete in a matter of a few minutes to several hours. With the less reactive amines on the other hand, and/or in the case of long chain halosulfates where contact between the reactants may be a problem, longer reaction periods ranging e.g. from several hours to several days may be desirable.

Generally, it will be desirable to employ an excess of ammonia or the organic amine in order to insure a high conversion of the chlorosulfate. An excess of ammonia or amine however is not necessary, and in some cases it may be desirable to employ the chlorosulfate in excess.

In most cases the reaction is preferably carried out under essentially anhydrous conditions in order to avoid hydrolysis of the chlorosulfate to a carboxylic acid and other complicating side reactions. The reaction may be carried out by merely mixing the chlorosulfate with ammonia or amine either in the absence or presence of a solvent. Suitable solvents include e.g. ethers such as diethyl ether, dimethoxyethane ($CH_3OCH_2CH_2OCH_3$), hydrocarbon solvents such as hexane, heptane, octane, benzene, toluene or xylene; chlorinated hydrocarbon solvents such as methylene chloride, chloroform, or chlorofluorinated hydrocarbons such as trichlorotrifluoroethane.

In the case of ammonia, the ammonolysis of the chlorosulfates to form amides is preferably carried out in most cases by passing an excess of anhydrous ammonia into the halosulfate or a solution or suspension thereof in an inert anhydrous solvent. The reaction is exothermic and it may be desirable to provide means for cooling the reaction. The inorganic ammonium salts formed as by-products may be removed e.g. by filtration or by a water wash, and the amide may be then isolated and purified by conventional techniques.

In the case of the reaction of organic amines with halosulfates in accordance with the invention, the reaction is usually carried out by slowly adding the halosulfate to an excess of the amine, or conversely by slowly adding an excess of the amine to the halosulfate, or to a solution or suspension thereof in an inert anhydrous solvent. The reaction is exothermic and cooling is sometimes desirable. The by-products of the reaction of the halosulfates with organic amines, in addition to inorganic amine salts (e.g. hydrofluoride and hydrochloride amine salts) include by-product sulfamides. These sulfamides are generally crystalline solids which may separate from the reaction mixture due to their limited solubility in the amide product or the differential solubility between the sulfamide and the amide product in various solvents. In some cases, where the sulfamide and amide are both soluble in the reaction solvent used, e.g. ether, the mixed solids can be isolated by evaporation of the solvent, and then separated by use of another solvent such as petroleum ether, in which only the amide is soluble. Sometimes it is preferable to remove the amide from the sulfamide by simple distillation under reduced pressure.

When the amine reactant contains functional groups having a labile hydrogen, such as a hydroxyl group, which also may react with the halosulfate, it is preferable to conduct the reaction at the lowest temperature at which practicable rates and conversions are obtained in order to avoid the formation of by-products. For example, when the amine reactant is a hydroxyl amine, the hydroxyl group may also react with the halosulfate to form an ester. The amine group, however, is generally more reactive and the reaction of the hydroxyl group can be minimized or essentially excluded by proper choice of reaction conditions, particularly the use of relatively low temperatures at which the hydroxyl group does not react.

In the reaction of a polychlorosulfate with a polyamine to form a polyamide, it may be particularly desirable to heat the reaction mixture at a temperature of e.g. 100° C., after the two components have been interacted at a relatively lower temperature, in order to produce high molecular weight polyamides. In carrying out the reaction of polychlorosulfates with polyamines to form polyamides, the use of an inert solvent is particularly desirable since the products of the reaction are relatively high melting solids.

The following examples are intended to illustrate the invention:

EXAMPLE 1.—AMMONOLYSIS OF n-$C_3F_7$—$OSO_2Cl$

Anhydrous ammonia is passed for 10 minutes into a solution of 1 gram (0.0035 mole) of $C_3F_7OSO_2Cl$ in 25 ml. of anhydrous ether at −75° C. while shaking. The reaction mixture is allowed to warm slowly to room temperature to boil out excess ammonia. The remaining solution is filtered to remove insolubles and the filtrate is evaporated. There is obtained 0.7 gram of slightly yellow crystals having a melting point of 91° to 93° C. After one recrystallization from 1,1,2-trichlorotrifluoroethane there is obtained 0.6 gram (100% yield) of the spectroscopically pure amide,

having a melting point of 93.5 to 94.5° C. (uncorrected).

EXAMPLE 2.—REACTION OF $C_3F_7OSO_2Cl$ WITH o-BROMOANILINE

The chlorosulfate n-perfluoropropyl chlorosulfate, $C_3F_7OSO_2Cl$ is added to an excess of o-bromoaniline in ethyl ether at a temperature of 0° C. After the addition is complete the reaction mixture is stirred at room temperature for 1 hour and then after removal of ether for an additional hour at 100° C. The reaction mixture is diluted with ethyl ether, and the ethereal solution is washed with dilute HCl. The ether layer is separated and dried with anhydrous calcium sulfate. The ether is distilled off to produce the solid amide N-orthobromophenylperfluoropionamide

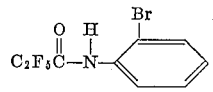

having a melting point of 126° C.

EXAMPLE 3.—REACTION OF $CF_3CF_2CF_2OSO_2Cl$ WITH MONOETHANOLAMINE

To a solution of 2.0 grams (0.007 mole) of $CF_3CF_2CF_2OSO_2Cl$ in diethyl ether there is slowly added at room temperature 3.1 grams (0.05 mole) of monoethanolamine with shaking and cooling to control the exothermic reaction. A white precipitate is formed and the mixture separates into two layers. After heating to boil, the ethereal layer is decanted. The residue is extracted with fresh diethyl ether several times and the extracts are combined with the original ethereal layer. The ether is evaporated and there is obtained a yellow oil consisting of the fluorocarbon hydroxy amide

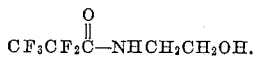

The infrared spectrum of this compound shows strong bands at 2.87μ; 5.8μ and 6.38μ consistent with the presence of the hydroxyl and amide groups.

EXAMPLE 4.—REACTION OF $CF_3CF_2CF_2OSO_2Cl$ WITH ISOPROPYLAMINE

To a solution of 2.0 grams (0.007 mole) of $CF_3CF_2CF_2OSO_2Cl$ in diethyl ether there is slowly added an excess of isopropylamine. After filtering off the solids formed during the reaction the filtrate is evaporated to remove the ether after which the residue is slurried with hexane and the resulting solid filtered to give 1.45 grams (100% yield) of N,N-diisopropyl sulfamide, $[CH_3]_2CHNH—SO_2—NHCH[CH_3]_2$ having a melting point of 105–106° C. *Analysis.*—Calculated for $C_6H_{16}N_2SO_2$: C, 39.98; H, 8.97; N, 15.55. Found: C, 39.99; H, 8.53; N, 15.72.

The filtrate was concentrated under reduced pressure to give a moderate yield of N-isopropylperfluoropropionamide,

the infrared spectrum of which shows bands at 5.9μ and 6.5μ characteristic of a monosubstituted amide.

EXAMPLE 5.—AMMONOLYSIS OF n-PERFLUOROPROPYL FLUOROSULFATE

Anhydrous ammonia is passed for ten minutes into a solution of 0.24 g. (0.0009 mole) of $n-C_3F_7OSO_2F$ in 10 ml. of anhydrous ethyl ether cooled at 0° C. The ether solution is filtered to remove insolubles and the filtrate is evaporated. There remains 0.2 g. of white crystals from which, after one re-crystallization from 1,1,2-trichlorotrifluoroethane, there is obtained 0.18 g. (100% yield) of the spectroscopically pure amide

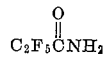

EXAMPLE 6.—AMMONOLYSIS OF $CF_2ClCFClOSO_2Cl$

Anhydrous ammonia is passed for 15 minutes into 0.4 gram (0.0015 mole) of the above chlorosulfate in 15 ml. of anhydrous ether cooled to 0° C. The solution is filtered to remove ammonium chloride, ammonium fluoride and other inorganic products. The solvent is removed from the filtrate by distillation. The remaining white solid weighing about 0.3 g. is recrystallized from a $CCl_4—CH_2Cl_2$ mixture. There is obtained about 0.2 g. of crude

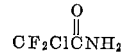

a white solid having a melting point of 81 to 82° C., this melting point not being depressed on admixture with

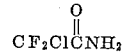

prepared by ammonolysis of known

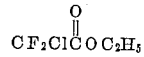

The infrared spectrum of the product of this reaction matches that spectrum taken of an authentic sample of

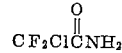

EXAMPLE 7.—AMMONOLYSIS OF 1,2,-DICHLORO-1,2,2-TRIFLUOROETHYL FLUOROSULFATE

Anhydrous ammonia is passed for one-quarter hour into a solution of 0.2 g. (0.0008 mole) of $CF_2ClCFClOSO_2F$ in 10 ml. of 1,1,2-trichlorotrifluoroethane. The reaction mixture is filtered to remove insolubles and the filtrate is evaporated. There remains a small amount of white crystals having a melting point of 76° to 77° C. from which, after recrystallization from methylene chloride, there is obtained 0.1 g. (97% yield) of the amide

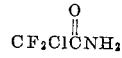

The infrared spectrum of this amide matches that of

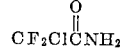

prepared by ammonolysis of known

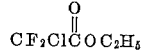

The melting point of the known chlorodifluoroacetamide is not depressed on admixture with the amide derived from the fluorosulfate.

EXAMPLE 8.—REACTION OF $C_4F_9OSO_2Cl$ WITH DIISOBUTYLAMINE

The chlorosulfate, $C_4F_9OSO_2Cl$, prepared by the reaction of $C_4F_9I$ with chlorosulfonic acid is added drop by drop to an excess of diisobutylamine cooled to 0° C. After the addition is complete the reaction mixture is stirred at room temperature for 2 hours. After the addition of diethyl ether, the ethereal solution is separated and washed with dilute HCl. The ether layer is separated and dried with anhydrous calcium sulfate after which the ether is distilled off to produce the solid amide

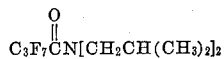

having a melting point of 155° C. after recrystallization from benzene.

EXAMPLE 9.—REACTION OF $C_4F_9OSO_2Cl$ WITH DICYCLOHEXYLAMINE

The chlorosulfate $C_4F_9OSO_2Cl$ is added to an excess of dicyclohexylamine in ethyl ether drop by drop while the reaction is cooled to a temperature of 0° C. After the addition is complete, the reaction mixture is stirred for 2 hours at room temperature. After dilution with additional ether, the ether solution is washed with dilute HCl. The ether layer is separated and dried with anhydrous calcium sulfate. The ether is distilled off, and the solid product, after recrystallization from benzene has a melting point of 180° C. This is N,N-dicyclohexyl-perfluorobutyramide has the following structure:

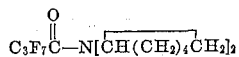

EXAMPLE 10.—AMMONOLYSIS OF $CF_3CF_2CF(CF_3)(CH_2CF_2)_3OSO_2Cl$

Anhydrous ammonia is passed for 15 minutes into a solution of 1 gram (0.0019 mole) of the above chlorosulfate in 40 ml. of anhydrous ethyl ether cooled to 0° C. The reaction mixture is warmed to room temperature, filtered and distilled to remove solvent. From the distillation of the residue under reduced pressure there is obtained 0.7 gram (91% yield) of the amide

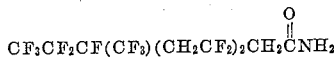

having a boiling point of 109° to 110° C. at less than 0.1 mm. Hg, this being an oil at room temperature, and a solid at ice temperature. This compound is analyzed as follows. Calculated for $C_{10}H_8F_{13}ON$: C, 29.6; H, 2.0; N, 3.5. Found: C, 29.7; H, 2.0; N, 3.5.

This compound has a typical amide infrared spectrum with the carbonyl stretching vibration at 5.95μ, NH stretching vibration at 3.02μ and 3.15μ, and NH bending (probably) at 6.20μ.

EXAMPLE 11.—AMMONOLYSIS OF $C_2F_5CF(CF_3)(CH_2CF_2)_2OSO_2F$

Anhydrous ammonia is passed for 15 minutes into a solution of 2 g. (0.00449 mole) of $$C_2F_5CF(CF_3)(CH_2CF_2)_2OSO_2F$$

in 10 ml. of anhydrous ethyl ether cooled at 0° C. The reaction mixture is filtered to remove insolubles and the filtrate is evaporated. There remains 0.15 g. (98% yield) of an oil which is shown to be nearly pure

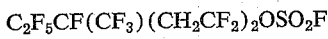

by its infrared spectrum.

By distillation in a small Vigreux unit there is obtained a fraction of the pure amide having a boiling point of 85° to 86° C. at about 0.1 mm. Hg for which there is absorption maxima in the infrared spectrum at 5.93μ due to carbonyl stretching vibration, at 3.0 and 3.2μ, due to NH stretching vibration, and at 6.2μ due probably to NH bending. The spectrum has a general similarity expected for homologs to that for the amide

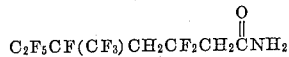

made by ammonolysis of the chlorosulfate $$C_2F_5CF(CF_3)(CH_2CF_2)_3OSO_2Cl$$

in accordance with Example 10.

EXAMPLE 12.—AMMONOLYSIS OF $C_3F_7[CF_2CF(CF_3)]_4(CF_2CF_2)_9$ avOSO$_2$Cl

Anhydrous ammonia is passed for 15 minutes through a solution of 0.5 g. (0.00028 mole) of the above chlorosulfate in 10 ml. of anhydrous ether cooled to −75° C. The reaction is allowed to warm to room temperature to evaporate excess ammonia, and filtered. The solvent is distilled from the filtrate, and there is obtained, upon further distillation, 0.4 g. (83% conversion) of the amide,

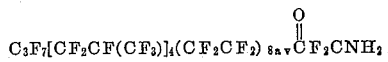

a viscous white oil, having a boiling point of 115° to 119° C. at about 0.1 mm. Hg and having the following analysis. Calculated for $C_{33}F_{65}ONH_2$: C, 23.8; H, 0.12; N, 0.84. Found: C, 23.4; H, 0.6; N, 0.41.

EXAMPLE 13.—REACTION OF

WITH DIMETHYLAMINOPROPYLAMINE

To 15.0 g. (0.03 mole) of the chlorosulfate

dissolved in 100 ml. of diethyl ether there is slowly added 20.4 g. (0.20 mole) of 3-dimethylaminopropylamine, $[CH_3]_2NCH_2CH_2CH_2NH_2$. An exothermic reaction occurs; a white solid precipitates and the liquid separates into a dense yellow oil and an upper ether phase. The reaction mixture is stirred for one hour at room temperature and refluxed for four hours. The upper ether layer is decanted and the lower oil layer is extracted with hot diethyl ether and the extracts are combined with the upper ethereal layer. The latter is evaporated to remove the ether and distilled at reduced pressure. After removal of a forecut of unreacted amine there is collected 9.4 g. (65.7% yield) of a viscous oil consisting of the fluorocarbon amide

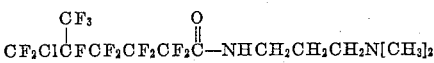

boiling at 98–99° C. at about 0.5 mm. Hg.

The quaternary methiodide of the above amide is prepared by adding an excess of methyl iodide to the amide dissolved in ether. A crystalline solid separates slowly on standing. After filtering and recrystallization from ethyl acetate, and drying in vacuo, a crystalline solid is obtained melting at 148° to 150° C. consisting of the quaternary methiodide:

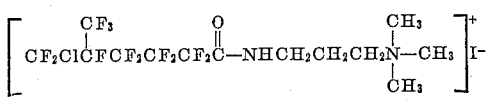

Analysis.—Calculated for $C_{13}H_{16}F_{12}ClIN_2O$: C, 25.73; H, 2.66; F, 37.58; Cl, 5.84; I, 20.93. Found: C, 26.16; H, 3.08; F, 37.77; Cl, 5.69; I, 20.81.

EXAMPLE 14.—REACTION OF

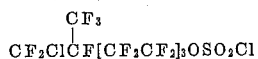

WITH DIMETHYLAMINOPROPYLAMINE

Following the procedures of Example 13, the chlorosulfate

is reacted with an excess of $[CH_3]_2NCH_2CH_2CH_2NH_2$.

There is obtained a 71% yield of a viscous oil boiling at 106°–113° C. at about 0.5 mm. Hg having the structure

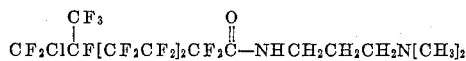

Following the procedures of Example 13 the quaternary methiodide of the above fluorocarbon amide is prepared and there is obtained a crystalline solid having a melting point of 182°–185° C. and having the structure:

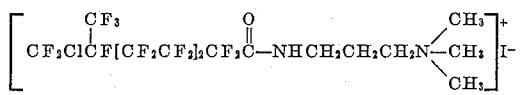

*Analysis.*—Calculated for $C_{15}H_{16}ClF_{16}IN_2O$: C, 25.49; H, 2.29; Cl, 5.02; I, 17.97; N, 3.96. Found: C, 25.64; H, 1.91; Cl, 4.68; I, 17.65; N, 3.40.

EXAMPLE 15.—REACTION OF

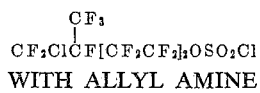

WITH ALLYL AMINE

To a solution of 25 grams (0.05 mole) of the chlorosulfate

in diethyl ether there is added slowly 18.7 grams (0.33 mole) of allyl amine, $CH_2=CHCH_2NH_2$, with stirring at room temperature. An exothermic reaction occurs and a dense yellow oil separates. The mixture is stirred for six hours during which time the oil partially solidifies. The ether layer is then decanted and the semi-solid residue is extracted repeatedly with hot fresh diethyl ether. The decanted ether layer and the ether extracts are combined and the ether evaporated to give a crystalline residue. This latter material is mixed with hot petroleum ether (i.e. a light petroleum fraction boiling at 30–60° C.) and then filtered. The solid residue in the filter is washed with hot petroleum ether, the filtrate being retained. After recrystallization of the solid residue (6.6 grams) from a mixture of diethyl ether and petroleum ether a crystalline solid is obtained consisting of N,N-diallyl sulfamide, $$CH_2=CHCH_2NHSO_2NHCH_2CH=CH_2$$

having a melting point of 76.5–78° C. *Analysis.*—Calculated for $C_6H_{12}N_2O_2S$: C, 40.90; H, 6.88; S, 18.16. Found: C, 40.92; H, 6.75; S, 17.77. The petroleum ether filtrate is distilled to remove the petroleum ether and there is obtained 15.6 grams (74.5% yield) of a straw colored oil having a boiling point of 90 to 91° C. at 1 mm. Hg consisting of the fluorocarbon unsaturated amide having the structure

*Analysis.*—Calculated for $C_{10}H_6F_{12}ClNO$: C, 28.62; H, 1.44; F, 54.33; Cl, 8.45; N, 3.34. Found: C, 28.79; H, 1.54; F, 43.99; Cl, 8.21; N, 3.18.

The amide, prepared as described above, is polymerized to a viscous oil by heating at 70–90° C. for about 48 hours in the presence of about 7% by weight of benzoyl peroxide (added in 3 equal portions).

EXAMPLE 16.—REACTION OF

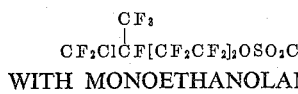

WITH MONOETHANOLAMINE

To a solution of 25.0 grams (0.05 mole) of

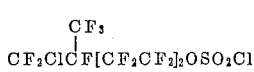

in diethyl ether there is slowly added at room temperature 19.3 grams (0.33 mole) of ethanolamine, $$HOCH_2CH_2NH_2$$

An exothermic reaction occurs and the mixture separates into an ethereal phase and a dense lower yellow oil layer. The reaction mixture is stirred for five hours at room temperature then allowed to stand. The upper ethereal layer is decanted and the lower oily layer is extracted with boiling diethyl ether several times. The ether layer is combined with the ether extracts; the ether is evaporated and the residue distilled in vacuo. A colorless viscous oil is obtained weighing 14.8 grams (70% yield) boiling at 100° C. at about 0.1 mm. Hg and consisting of N-[perfluoro-(5-chloromethylhexanoyl)]-2-aminoethanol,

*Analysis.*—Calculated for $C_9H_6F_{12}ClNO_2$: C, 25.52; H, 1.43; N, 3.31. Found: C, 25.54; H, 1.50; N, 3.30.

The methacrylate ester of the above N-(chloroperfluoroacyl)amino alcohol is prepared as follows:

To a mixture of 10.6 grams (0.025 mole) of

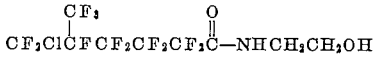

dissolved in diethyl ether, 2 milliliters of pyridine, 5 grams of anhydrous sodium carbonate and 5 grams of anhydrous calcium sulfate there is added dropwise 7.9 grams (0.075 mole) of methacrylyl chloride in diethyl ether. The mixture is stirred for 2 hours at room temperature, refluxed for an additional hour and then cooled. Water is added; and ether layer is separated from the aqueous phase, dried, and after removal of the ether by distillation, a yellow oil is obtained boiling at 120°–140° C. at about 0.5 mm. Hg. After redistillation there is obtained 6.3 grams (51% yield) of the methacrylate ester

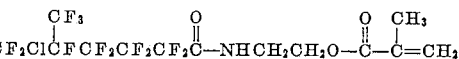

having a boiling point of 110–130° C. at about 0.2 mm. Hg. *Analysis.*—Calculated for: $C_{13}H_{10}F_{12}ClNO_3$: C, 31.75; H, 2.05; F, 46.37. Found: C, 32.04; H, 2.09; F, 46.51.

EXAMPLE 17.—REACTION OF $C_8F_{17}OSO_2Cl$ WITH MONOETHANOLAMINE

Following the procedures of Example 16, the perfluorocarbon chlorosulfate $CF_3(CF_2)_7OSO_2Cl$ is reacted with an excess of monoethanolamine and there is obtained a good yield of

having a melting point of 82–83° C. and a boiling point of 117–120° C. at 1 mm. Hg. *Analysis.*—Calculated for $C_{10}H_6F_{15}NO_2$: C, 26.27; H, 1.33; F, 62.34; N, 3.06. Found: C, 26.37; H, 1.31; F, 62.89; N, 2.85.

EXAMPLE 18.—REACTION OF $$CF_3CF_2CF_2[CF_2CF_2]_3OSO_2Cl$$

WITH MONOETHANOLAMINE

Following the procedures of Example 16, the perfluorocarbon chlorosulfate $CF_3CF_2CF_2[CF_2CF_2]_3OSO_2Cl$ is reacted with an excess of monoethanolamine, $$HOCH_2CH_2NH_2$$

and there is obtained a 70% yied of

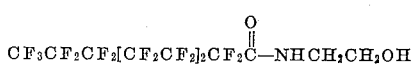

having a melting point of 80°–85° C. *Analysis.*—Calculated for $C_{11}H_6F_{17}NO_2$: C, 26.05; H, 1.83; F, 63.69; N, 2.76. Found: C, 26.20; H, 1.24; F, 62.82; N, 2.78.

The methacrylate ester of the above N-(perfluluforo-acyl)amino alcohol is prepared in the same manner as in the preceding example.

EXAMPLE 19.—REACTION OF

CF₂ClCF[CF₂CF₂]₂OSO₂Cl

WITH N-ETHYLAMINOETHANOL

To a solution of 25 grams (0.05 mole) of the above chlorosulfate dissolved in diethyl ether there is slowly added with stirring and cooling to control the exothermic reaction 29.4 grams (0.33 mole) of N-ethylaminoethanol, $C_2H_5NHCH_2CH_2OH$. The resulting two-phased mixture is refluxed for 4 hours and then cooled. After separating the ether layer, the non-ethereal layer is extracted with additional hot ether. The ether phases are combined and after evaporating the ether, a product is obtained boiling at 105°–121° C. at about 1 mm. Hg consisting of the hydroxy amide.

$$CF_2ClCFCF_2CF_2CF_2C(=O)-NCH_2CH_2OH \quad (CF_3, C_2H_5)$$

containing a minor amount of an ester probably formed by the concurrent reaction of the hydroxyl group with the chlorosulfate group.

EXAMPLE 20.—REAСTION OF

CF₂ClCF[CF₂CF₂]₃OSO₂Cl

WITH N-ETHYLAMINOETHANOL

Following the procedures of Example 16, the above chlorosulfate is reacted with an excess of $$C_2H_5NHCH_2CH_2OH$$

A 48% yield of the hydroxy amide $$CF_2ClCFCF_2CF_2]_2CF_2C(=O)-NCH_2CH_2OH \quad (CF_3, C_2H_5)$$

boiling at 147°–167° C. at about 1 mm. Hg is obtained containing a minor amount of ester probably formed by the concurrent reaction of the hydroxyl group with the chlorosulfate group.

Following the procedures of Example 16, the methacrylate ester of the above hydroxy amide is prepared.

EXAMPLE 21.—REACTION OF

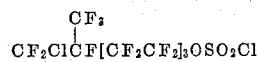
CF₃CF[CF₂CF₂]₂OSO₂Cl

WITH ETHYLAMINE

An excess of $C_2H_5NH_2$ gas is bubbled through a stirred ice-cold solution of 102.5 grams (0.212 mole) of

CF₃CF[CF₂CF₂]₂OSO₂Cl in 350 milliliters of anhydrous diethyl ether during a 5 hour period. Stirring is continued for 1 additional hour in the cold. The reaction mixture is then filtered to remove a white insoluble material and the filtrate is refluxed for 3 hours. The resulting mixture is then washed 10 times with 50 milliliter portions of water, dried with anhydrous magnesium sulfate and finally evaporated on a steam bath to yield a light brown oily liquid which partially solidifies on standing at room temperature. The solids are removed by filtration and the crude liquid product is distilled in vacuo to yield 65.0 grams (79% yield) of a colorless oily liquid, N-ethyl-perfluoro(5-methylhexan)amide, having a boiling point of 62–64° C. at about 0.1 mm. Hg and a refractive index $n_D^{28}$ 1.3350 and having the structure:

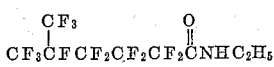
CF₃CFCF₂CF₂CF₂C(=O)NHC₂H₅

*Analysis.*—Calculated for $C_9H_6F_{13}NO$: C, 27.6; H, 1.55; N, 3.58. Found: C, 27.9; H, 2.04; N, 3.35. The infrared spectrum of this compound showed amide bands at 5.83µ and 6.43µ.

The solid material which precipitates on standing is extracted with hot petroleum ether and the extract allowed to cool to room temperature whereupon 4.5 grams of a crystalline material is deposited. The product is recrystallized from an ethanol-petroleum ether mixture, and identified as N,N′-diethylsulfamide $C_2H_5NHSO_2NHC_2H_5$ melting point 67.5–68.5° C. *Analysis.*—Calculated for $C_4H_{12}N_2O_2S$: C, 31.6; H, 7.95; N, 18.4; S, 21.1. Found: C, 31.4; H, 7.89; N, 18.0; S, 21.2.

EXAMPLE 22.—REACTION OF

CF₃CF[CF₂CF₂]₅OSO₂Cl

WITH ETHYLAMINE

An excess of ethylamine gas is bubbled into a stirred ice-cold solution of 107.5 grams (0.184 mole) of the above chlorosulfate in 250 milliliters of anhydrous diethyl ether under a blanket of dry nitrogen until the mixture is distinctly alkaline. The mixture is refluxed for one hour. An upper layer is decanted from a lower layer consisting of a viscous brown liquid. The lower layer is then washed several times with petroleum ether. The combined petroleum ether washings from the lower layer and the upper layer are then washed with water, dried with anhydrous magnesium sulfate and evaporated on a steam bath leaving 86 grams of a dark brown liquid which partially solidifies on standing at room temperature. The solid material is removed by filtration leaving a dark brown liquid which is distilled in vacuo to yield 73 grams (81% yield) of an amber colored oily liquid. Redistillation in vacuo provides the pure oily product N-ethyl-[perfluoro-(7-methyloctan)]amide

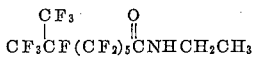
CF₃CF(CF₂)₅CNHCH₂CH₃ having a boiling point of 88° C. at about 0.1 mm. Hg and a refractive index $n_D^{26.5}$ 1.3348. *Analysis.*—Calculated for $C_{11}H_6F_{17}NO$: C, 26.9; H, 1.23. Found C, 26.70; H, 1.31. The infrared spectrum of this compound shows amide bands at 5.84µ and 6.46µ.

EXAMPLE 23.—REACTION OF

CF₃CF[CF₂CF₂]₄OSO₂Cl

WITH ETHYLAMINE

An excess of ethylamine gas is bubbled through a stirred ice-cold solution of 523.5 grams (0.76 mole) of

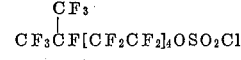
CF₃CF[CF₂CF₂]₄OSO₂Cl in 600 milliliters of anhydrous diethyl ether for a period of 7 hours. The mixture is filtered to remove insoluble material formed during the reaction and the filtrate is then refluxed for 3 hours. The filtrate is washed with water; a gel forms which is treated with a large excess of isopropyl ether forming an aqueous and an ether layer. The isopropyl ether layer is decolorized with charcoal, dried with anhydrous magnesium sulfate and the solvent is removed by distillation. The resulting dark brown liquid residue is distilled in vacuo to give a white solid. After recrystallization from 80–85% ethanol there is obtained a white crystalline material weighing 247 grams (55% yield), having a melting point of 53–54.5° C. consisting of the perfluorocarbon amide

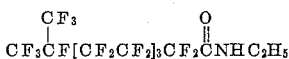
CF₃CF[CF₂CF₂]₃CF₂CNHC₂H₅

*Analysis.*—Calculated for $C_{13}H_6F_{21}NO$: C, 26.4; H, 1.02; N, 2.37; F, 67.5. Found, C, 26.5; H, 0.88; N, 2.46; F, 68.2.

EXAMPLE 24.—REACTION OF

WITH ETHYLAMINE

Following the procedures of Examples 20–22, the above chlorosulfate is reacted with an excess of ethylamine and there is obtained a white crystalline product consisting of the fluorocarbon amide $$CF_2ClCFCF_2CF_2CF_2CNHC_2H_5$$
(with CF₃ branch and C=O)

having a boiling point of 83–85° C. at about 0.1 mm. Hg and a refractive index $n_D^{28}$ 1.3579. The infrared spectrum of this compound displays strong bands at 5.93μ (carbonyl stretching vibration) and at 6.44μ (characteristic of secondary amide). *Analysis.*—Calculated for $C_9H_6ClF_{12}NO$: C, 26.52; H, 1.48; N, 3.44; Cl, 8.70. Found: C, 26.68; H, 2.22; N, 3.20; Cl. 8.34.

EXAMPLE 25.—REACTION OF $$CF_3CF_2CF_2[CF_2CF_2]_3OSO_2Cl$$

WITH ISOPROPYLAMINE

To a large molar excess of isopropylamine, $$[CH_3]_2CH—NH_2$$

dissolved in diethyl ether there is slowly added at room temperature 1.0 gram (0.0017 mole) of the above fluorocarbon chlorosulfate. The exothermic reaction is controlled by cooling in an ice bath. After filtering off the hygroscopic solids that are formed, the filtrate is concentrated by evaporation of the ether giving a yellow oil residue which is slurried in hexane and chilled in dry ice to induce crystallization. After several recrystallizations from diethyl ether, and washing with fresh hexane, the product is further purified by sublimation in vacuo to provide a 58% yield of a crystalline solid melting at 83°–87° C. consisting of the amide

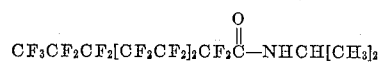

*Analysis.*—Calculated for $C_{12}H_8F_{17}NO$: C, 28.53; H, 1.60; F, 63.93. Found: C, 28.59; H, 1.63; F, 63.5.

EXAMPLE 26.—REACTION OF

WITH p-AMINOBENZOIC ACID

To a stirred suspension of 13.70 grams (0.1 mole) of p-aminobenzoic acid in 100 milliliters of anhydrous diethyl ether, there is slowly added a solution of 12.0 grams (0.02 mole) of

in 30 milliliters of diethyl ether. The mixture is refluxed for about 5 hours under an atmosphere of dry nitrogen. The reaction mixture is filtered from insoluble material and the filtrate then washed with 1 N HCl, dried with anhydrous magnesium sulfate and evaporated on a steam bath to give a good yield of N-[perfluoro-(7-chloromethyloctanoyl)]-p-aminobenzoic acid

having a melting point of 230–234° C. Recrystallization of this product from a 20% mixture of dimethoxyethane in benzene provides a white crystalline material having a melting point of 231.5–232° C. *Analysis.*—Calculated for $C_{16}H_6ClF_{16}NO_3$: C, 32.0; H, 1.01; Cl, 5.91; N, 2.34; molecular weight, 600. Found: C, 32.2; H, 0.85; Cl, 5.97; N, 2.33; molecular weight (neutralization equivalent), 601.

The principal absorption bands (in microns) in the infrared spectrum of this amide are 5.82, 5.92, 6.22, 6.50.

EXAMPLE 27.—REACTION OF

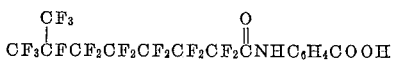

WITH p-AMINOBENZOIC ACID

Following the procedure of Example 26, the above chlorosulfate is reacted with p-aminobenzoic acid. There is obtained a good yield of a white crystalline solid having a melting point of 244–245° C. consisting of N-[perfluoro-(7-methyloctanoyl)]-p-aminobenzoic acid, $$CF_3CFCF_2CF_2CF_2CF_2CNHC_6H_4COOH$$
(with CF₃ branch and C=O)

*Analysis.*—Calculated for $C_{16}H_6F_{17}NO_3$: C, 32.9; H, 1.04; N, 2.40; molecular weight, 583. Found: C, 32.9; H, 0.93; N, 2.40; molecular weight (neutralization equivalent), 585.

The principal absorption bands (in microns) in the infrared spectrum of this amide are 5.83, 5.93, 6.21, 6.51.

EXAMPLE 28.—REACTION OF

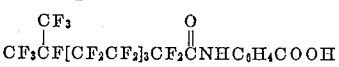

WITH p-AMINOBENZOIC ACID

Following the procedures of Examples 26, the above chlorosulfate is reacted with p-aminobenzoic acid to provide a good yield of a white crystalline solid having a melting point of 244–245° C. consisting of N-[perfluoro-(9-methyldecanoyl)]-p-aminobenzoic acid $$CF_3CF[CF_2CF_2]_3CF_2CNHC_6H_4COOH$$
(with CF₃ branch and C=O)

*Analysis.*—Calculated for $C_{18}H_6F_{21}NO_3$: C, 31.6; H, 0.89; N, 2.05; molecular weight, 683. Found: C, 31.6; H, 0.91; N, 2.08; molecular weight (neutralization equivalent), 687.

The principal absorption bands (in microns) in the infrared spectrum of this amide are 5.85, 5.94, 6.24, 6.51.

EXAMPLE 29.—REACTION OF $$CF_3CF[CF_2CF_2]_5OSO_2Cl$$
(with CF₃ branch)

WITH p-AMINOBENZOIC ACID

Following the procedure of Example 26, the above chlorosulfate is reacted with p-aminobenzoic acid. There is obtained a good yield of a crude product which after recrystallization from a mixture of 10 to 15% tetrahydrofuran in benzene provides a white crystalline material having a melting point of 249–250.5° C. consisting of N - [perfluoro - (11-methyldodecanoyl)]-p-aminobenzoic acid $$CF_3CF[CF_2CF_2]_4CF_2CNHC_6H_4COOH$$
(with CF₃ branch and C=O)

*Analysis.*—Calculated for $C_{20}H_6F_{25}NO_3$: C, 30.7; H, 0.77; N, 1.79; molecular weight, 783. Found: C, 30.8; H, 0.61; N, 1.43; molecular weight (neutralization equivalent), 785.

The principal absorption bands (in microns) in the 5–6.5μ region of the infrared spectrum of the above amide are: 5.82, 5.92, 6.22, 6.49.

EXAMPLE 30.—REACTION OF

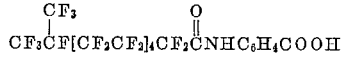

WITH GLYCINE

A solution of 19.7 grams (0.029 mole) of the above chlorosulfate in 30 milliliters of anhydrous diethyl ether is added drop by drop to a stirred suspension of 22.5 grams (0.3 mole) of glycine, $NH_2CH_2COOH$, in 120 milliliters of anhydrous diethyl ether. The mixture is refluxed under nitrogen for six hours after which the reaction mixture is filtered from 21.8 grams of insoluble material and the filtrate is then washed with water, dried with anhydrous magnesium sulfate, and evaporated on a steam bath to give 14 grams (78% yield) of a liquid residue which rapidly solidifies on standing at room temperature. Recrystallization of this product from a mixture of benzene and ethyl acetate in the ratio of 9:1 provides a white crystalline solid having a melting point 130–131° C. consisting of N-[perfluoro-(9-methyldecanoyl)]aminoacetic acid

EXAMPLE 31.—REACTION OF $C_7F_{15}CF_2OSO_2Cl$ WITH β-ALANINE

Following the procedures of Example 30, the chlorosulfate $C_7F_{15}CF_2OSO_2Cl$ is reacted with a ten fold molar excess β-alanine ($NH_2CH_2CH_2COOH$). A solid product is obtained which after recrystallization from ethyl acetate has a melting point of 133–134° C., this being the amidoacid.

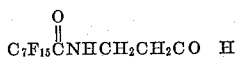

*Analysis.*—Calculated for $C_{11}H_6F_{15}NO_3$: C, 27.2; H, 1.24; F, 58.8; N, 2.89; molecular weight 485. Found: C, 27.0; H, 1.36; F, 57.8; N, 2.20; molecular weight (by neutralization equivalent) 480.

EXAMPLE 32.—PREPARATION OF POLYAMIDE FROM

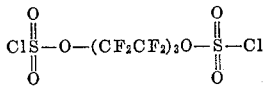

The above dichlorosulfate is reacted with an excess of hexamethylenediamine $$H_2NCH_2CH_2CH_2CH_2CH_2CH_2NH_2$$

first at 0°–25° C. for 2 hours and then at 100° C. for 6 hours. A thermoplastic linear solid polymer having the repeating structure

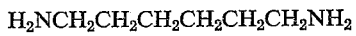

is obtained.

EXAMPLE 33.—PREPARATION OF POLYAMIDE FROM $ClO_2SOCF_2(CH_2CF_2)_4OSO_2Cl$

The above dichlorosulfate is reacted with an excess of hexamethylenediamine $$H_2NCH_2CH_2CH_2CH_2CH_2CH_2NH_2$$

first at 0–25° C. for 3 hours and then at 100° C. for about 6 hours. A thermoplastic linear solid polymer of good orientability having the repeating structure

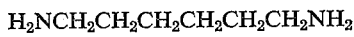

is obtained.

The halogenated amides produced in accordance with the invention have many valuable uses, both in themselves and as intermediates. Of particular value are those prepared from highly fluorinated or highly fluorochlorinated halosulfates, for example perfluorohalosulfates, perfluorochlorohalosulfates or perfluorohydrohalosulfates. Of the latter type those having repeating [$CH_2CF_2$] groups are of especial interest. In such compounds, the highly fluorinated portion of the molecule, particularly those having a chain length of 6 or more carbon atoms, has low surface energy providing valuable surface properties. Thus, for example amido acids such as that obtained by the reaction of a perfluorinated halosulfate with an aminoacid as in Example 30, have remarkable surface properties and are useful for example as surfactants or leveling agents in aqueous emulsion type self-polishing wax compositions. Compounds of the type shown in Example 30 are described and claimed in the co-pending application Serial No. 276,160 filed April 29, 1963 of Murray Hauptschein and Sameeh S. Toukan for Fluroinated Organic Compounds. The Werner-type chromium complexes of compounds of the type shown in Example 30 have unusual value for the treatment of leather, textiles, paper and the like to provide remarkable resistance to wetting by both aqueous and oleaginous systems.

Reaction products of highly fluorinated halosulfates with the primary amines, such as ethyl amine, as illustrated in Examples 22 and 23, provide valuable intermediates for conversion into derivatives such as amidoacids similar to that of Example 30. Such amido acid derivatives may be prepared, for example by treatment of the amide produced by the reaction of the halosulfate and the primary amine with metallic sodium and a haloester such as ethylbromacetate, followed by hydrolysis of the resulting ester to the free acid or a salt thereof.

Reaction products of highly fluorinated halosulfates with hydroxy amines are valuable intermediates for conversion into acrylates or methacrylates as shown, e.g. in Examples 16–18. The acrylates or methacrylates may be readily polymerized to provide polymers suitable for treatment of textiles, paper or other fibrous materials to impart high wetting resistance both to aqueous and oleaginous systems. The reaction products of highly fluorinated halosulfates with unsaturated amines as illustrated in Example 15 likewise provides monomers for polymerization into similar valuable resins.

The reaction products of highly fluorinated halosulfates with primary or secondary amines containing a tertiary amine end group as illustrated in Examples 13 and 14, provide products containing a tertiary amino group which may be converted into quaternary ammonium compounds and hydrogen halide salts. Such highly fluorinated quaternary ammonium compounds and salts have valuable surface properties and are suitable, for example as leveling agents for aqueous emulsion-type self polishing wax compositions.

Halogenated diamides prepared by the reaction of dihalosulfates and monoamines have valuable uses as plasticizers, particularly for halogenated polymers or as intermediates for conversion into diamines by reduction of the diamide e.g. with lithium aluminum hydride. Polyamides prepared, for example by the reaction of dihalosulfates with diamines provide valuable thermoplastic materials for the preparation of films, fibers, coating compositions and the like. Of particular interest are the polyamides prepared according to the invention containing repeating [$CH_2CF_2$] groups. The repeating [$CH_2CF_2$] groups provide tough polymers of relatively high crystallinity. Many of the halogenated amides prepared according to the invention are also useful as insecticides, bactericides and fungicides.

We claim:

1. A method for preparing halogenated amides which comprises intimately contacting a compound selected from the class consisting of ammonia, primary amines and secondary amines with a halogenated halosulfate of the formula $RCX_2OSO_2X$ where R is halocarbon radical having from 1 to about 50 carbon atoms and where X is selected from the class consisting of chlorine and fluorine.

2. A method in accordance with claim 1 in which R is at least half halogenated.

3. A method for preparing halogenated amides which comprises intimately contacting a compound selected from the class consisting of ammonia, primary amines, and secondary amines with a halogenated halosulfate of the formula $RCX_2OSO_2X$ where R is selected from the class consisting of perfluoroalkyl, perfluorochloroalkyl, perfluorohydroalkyl, and perfluorochlorohydroalkyl having from 1 to about 50 carbon atoms and where X is selected from the class consisting of chlorine and fluorine.

4. A method is accordance with claim 3 in which said amine is a primary amine.

5. A method in accordance with claim 3 in which said amine is a secondary amine.

6. A method in accordance with claim 3 in which said amine is a hydroxyl amine.

7. A method in accordance with claim 3 in which said amine is an amino acid.

8. A method in accordance with claim 3 in which said amine is an aromatic amine.

9. A method in accordance with claim 3 in which said amine is an aliphatic unsaturated amine.

10. A method for preparing halogenated amides which comprises intimately contacting a compound selected from the class consisting of ammonia, primary amines and secondary amines with a halogenated chlorosulfate of the formula $RCX_2OSO_2Cl$ where R is a halocarbon radical having from 1 to about 50 carbon atoms and where X is selected from the class consisting of fluorine and chlorine.

11. A method for preparing halogenated amides which comprises intimately contacting a compound selected from the class consisting of ammonia, primary amines and secondary amines with a halogenated chlorosulfate of the formula $RCX_2OSO_2Cl$ where R is a radical selected from the class consisting of perfluoroalkyl, perfluorochloroalkyl, perfluorohydroalkyl and perfluorochlorohydroalkyl having from 1 to about 50 carbon atoms and where X is selected from the class consisting of chlorine and fluorine.

12. A method for preparing halogenated amides which comprises intimately contacting a compound selected from the class consisting of ammonia, primary amines and secondary amines with a halogenated chlorosulfate of the formula $RCF_2OSO_2Cl$ where R is a halocarbon radical having from 1 to about 50 carbon atoms which is at least half halogenated.

13. A method for preparing halogenated amides which comprises intimately contacting a compound selected from the class consisting of ammonia, primary amines and secondary amines with a halogenated chlorosulfate of the formula $RCF_2OSO_2Cl$ where R is selected from the class consisting of perfluoroalkyl, perfluorochloroalkyl, perfluorohydroalkyl, and perfluorochlorohydroalkyl having from 1 to about 50 carbon atoms.

No references cited.

WALTER A. MODANCE, *Primary Examiner.*
NICHOLAS S. RIZZO, *Examiner.*